(12) United States Patent
Nishida

(10) Patent No.: US 7,818,161 B2
(45) Date of Patent: Oct. 19, 2010

(54) APPARATUS AND METHOD FOR UART EMULATION

(75) Inventor: Tsuyoshi Nishida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/498,260

(22) Filed: Jul. 6, 2009

(65) Prior Publication Data

US 2010/0169070 A1 Jul. 1, 2010

(30) Foreign Application Priority Data

Dec. 25, 2008 (JP) .............................. 2008-330656

(51) Int. Cl.
 *G06F 9/455* (2006.01)
 *G06F 3/00* (2006.01)
(52) U.S. Cl. ............................................. 703/24; 710/8
(58) Field of Classification Search .................... 703/24; 710/8
See application file for complete search history.

(56) References Cited

U.S. PATENT DOCUMENTS

| | | | |
|---|---|---|---|
| 5,446,869 A | 8/1995 | Padgett et al. | |
| 6,112,260 A * | 8/2000 | Colterjohn et al. | ............. 710/31 |

| | | | |
|---|---|---|---|
| 2005/0246478 A1 | 11/2005 | Tanaka | |
| 2006/0245533 A1 | 11/2006 | Rostampour | |

FOREIGN PATENT DOCUMENTS

| | | |
|---|---|---|
| JP | 06-035795 | 2/1994 |
| JP | 07-210493 | 8/1995 |
| JP | 2001-027920 | 1/2001 |
| JP | 2001-312453 | 11/2001 |
| JP | 2005-250975 | 9/2005 |
| JP | 2006-309764 | 11/2006 |
| JP | 2008-523726 | 7/2008 |

* cited by examiner

*Primary Examiner*—David Silver
(74) *Attorney, Agent, or Firm*—Blakely, Sokoloff, Taylor & Zafman LLP

(57) ABSTRACT

An information processing apparatus includes: a processor configured to run an operating system; a reconfiguration module configured to rewrite a capability pointer of a PCI device configuration to set a controller compatible of controlling a non-UART device to be incompatible; a virtualization module configured to virtualize one or more UARTs; and a recognition module configured to cause the operating system to recognize the UARTs virtualized by the virtualization module by altering hardware information.

4 Claims, 4 Drawing Sheets

APPARATUS AND METHOD FOR UART EMULATION

CROSS REFERENCE TO RELATED APPLICATION(S)

The present disclosure relates to the subject matters contained in Japanese Patent Application No. 2008-330656 filed on Dec. 25, 2008, which are incorporated herein by reference in its entirety.

FIELD

The present invention relates to an information processing apparatus capable of performing UART emulation.

BACKGROUND

Among the input/output interfaces of information processing apparatus such as personal computers (PCs), the serial port, parallel port, ISA (industry standard architecture) bus, and IDE (integrated drive electronics) are widely used. Conventional information processing apparatus employ, in addition to the above interfaces, the USB (universal serial bus), IEEE 1394, PCI (peripheral component interconnect), extended IDE, ATA (AT attachment) etc.

In spite of the above advancements of the computer input/output standards, there may occur a case that the OS (operating system) needs to access a general-purpose interface. Such general-purpose interfaces are interfaces that can be used safely in many environments. One of such general-purpose interfaces is the UART (universal asynchronous receiver transmitter). The UART sends and receives data via a serial transmission line. Furthermore, the UART converts a parallel signal transmitted from a PC into a serial signal and converts a serial signal transmitted from a peripheral device into a parallel signal.

It can be said from the above described perspective that the best method for accessing the kernel (OS) is to use a device that is connected to a UART. In these circumstances, an emulation-related technique has been proposed in which a UART is virtualized and a non-UART device connected to the resulting virtual UART is used for the purpose of debugging the OS. An example of such technique is described in JP-A-2006-309764.

However, where this conventional emulation technique is applied, the non-UART device is recognized by the OS and put under the control of the OS. Therefore, there is a probability that the non-UART device is excluded from the control of firmware such as the BIOS (basic input/output system) to disable the debugging.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION OF THE EMBODIMENTS

An embodiment of the present invention will be hereinafter described with reference to the drawings.

First, a configuration of an information processing apparatus according to the embodiment of the invention will be described with reference to FIGS. 1 and 2. This information processing apparatus is a battery-powered portable notebook personal computer 100 (hereinafter abbreviated as a computer 100).

Figure 1:
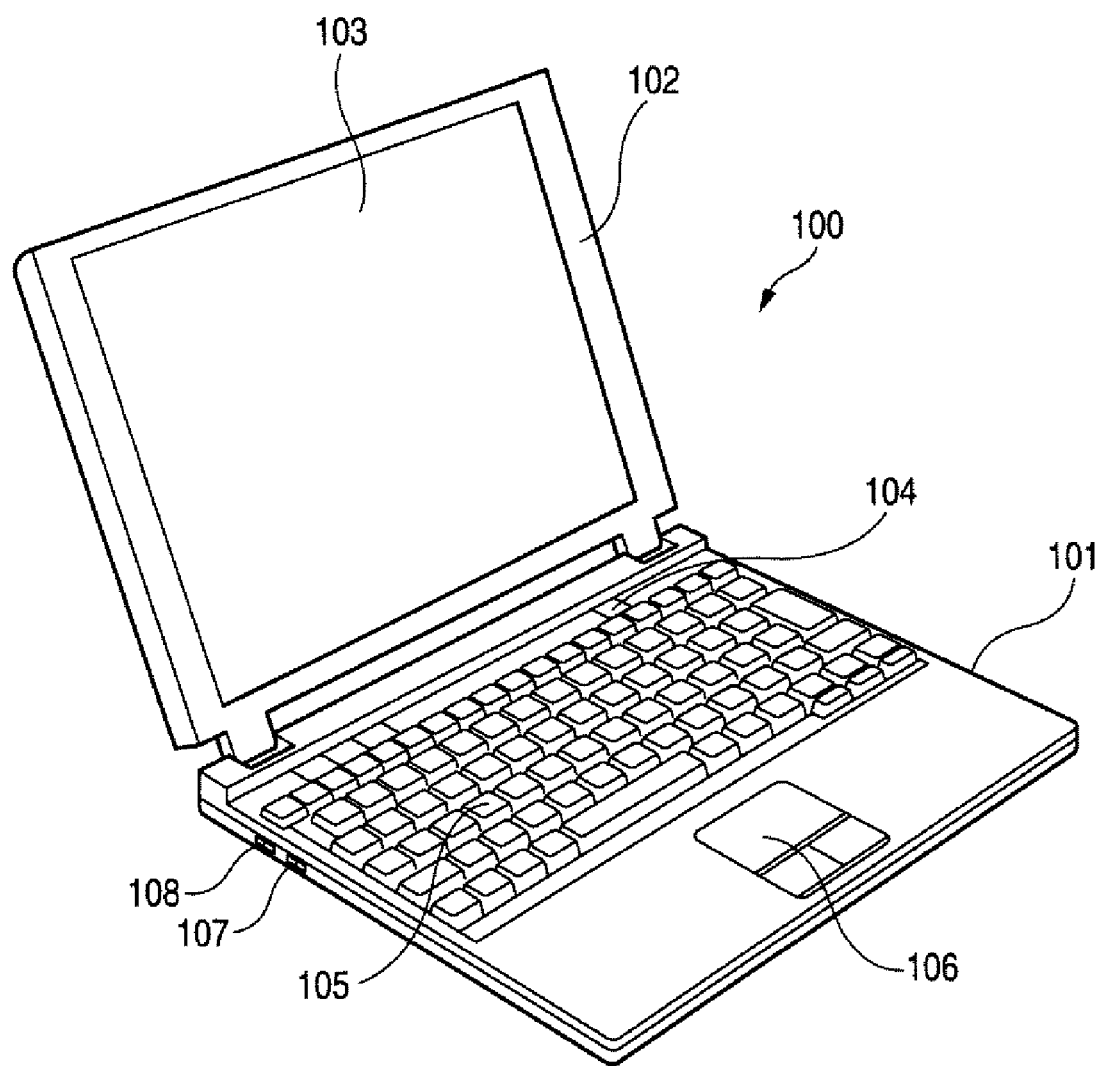
FIG. 1 is a perspective view of an information processing apparatus according to an embodiment of the present invention.

FIG. 1 is a perspective view of the computer 100 in a state that a display unit 102 is opened. The computer 100 includes a main body unit 101 and the display unit 102. The display unit 102 incorporates a display device which is an LCD (liquid crystal display) 103. The display screen of the LCD 103 is located approximately at the center of the display unit 102.

The display unit 102 is supported by the main body unit 101 so as to be rotatable with respect to the main body unit 101 between an open position where it exposes the top surface of the main body unit 101 and a closed position where it covers the top surface of the main body unit 101. The main body unit 101 has a thin, box-shaped body and the top surface of the main body unit 101 is provided with a power button 104 for powering on or off the computer 100, a keyboard (KB) 105, a touch pad 106, etc.

The left side surface, for example, of the main body unit 101 is provided with two connection ports 107 and 108 to each of which various devices can be connected in a detachable manner. For example, each of the connection ports 107 and 108 is a connector that complies with the USB standard. For example, a device that conforms to the USB standard (i.e., a USB device) can be connected to each of the connection ports 107 and 108 when necessary.

Figure 2:
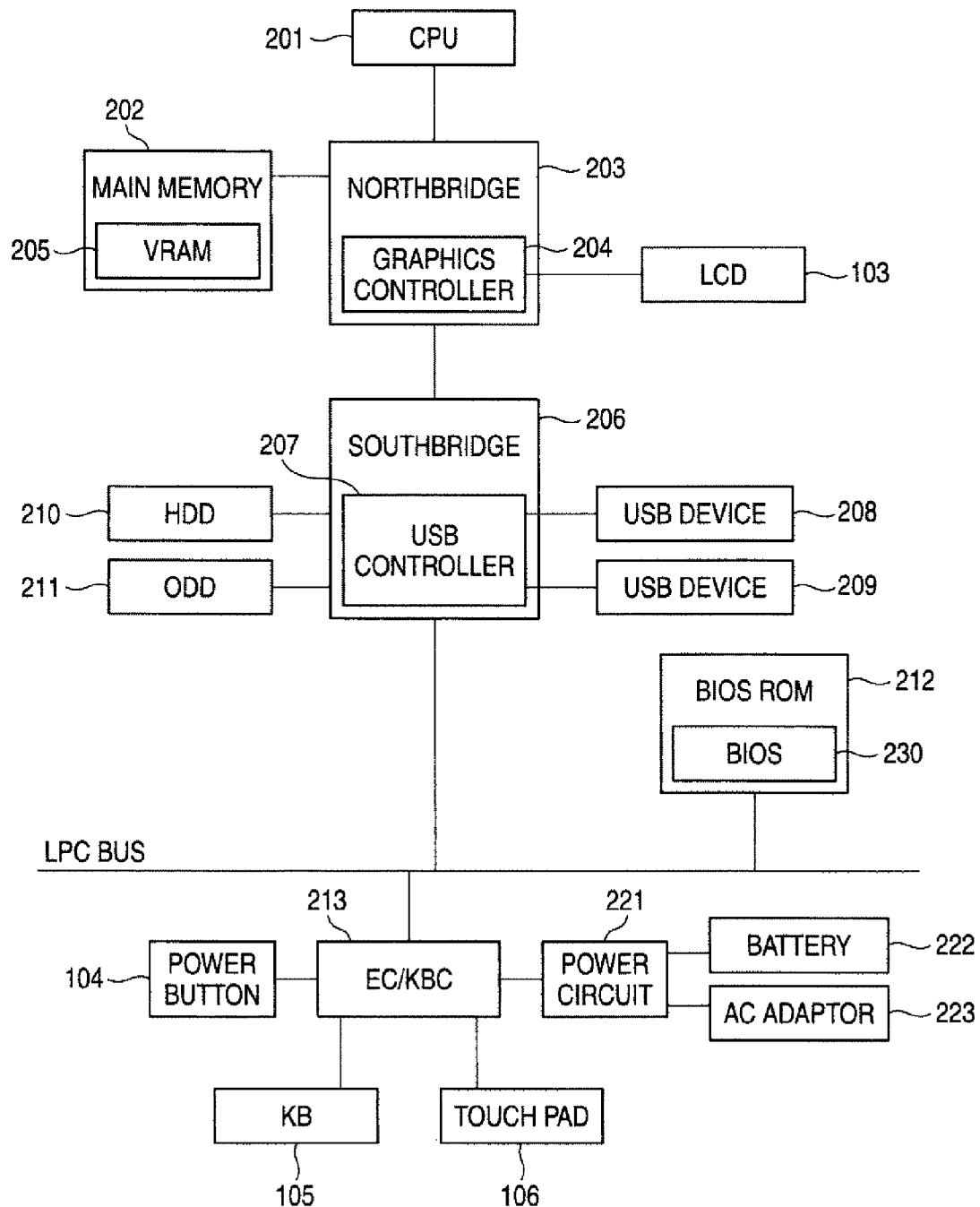
FIG. 2 is a block diagram showing a system configuration of the information processing apparatus of FIG. 1.

FIG. 2 is a block diagram showing a system configuration of the computer 100.

As shown in FIG. 2, the computer 100 is equipped with the LCD 103, the power button 104, the KB 105, the touch pad 106, a CPU 201, a main memory 202, a northbridge 203, a graphics controller 204, a video memory (VRAM) 205, a southbridge 206, a USS controller 207, a hard disk drive (HDD) 210, an optical disc drive (ODD) 211, a BIOS-ROM 212, an embedded controller/keyboard controller (EC/KBC) 213, a power circuit 221, a battery 222, an AC adaptor 223, etc.

The CPU 201 is a processor which controls the whole operation of the computer 100. The CPU 201 runs an OS and various application programs that have been loaded into the main memory 202. The OS and the various application programs are stored on a magnetic disk storage medium (hard disk) incorporated in the HDD 210 or an optical disc storage medium that is inserted in the ODD 211 and loaded into the main memory 202 from the storage medium.

The CPU 201 also runs BIOS programs (hereinafter referred to as a BIOS) 230 stored in the BIOS-ROM 212. The BIOS-ROM 212 takes the form of a nonvolatile memory such as a flash EEPROM so as to enable program rewriting.

The BIOS 230, which is programs for controlling various hardware components of the computer 100, is read from the BIOS-ROM 212 when the computer 100 is activated. The BIOS 230 executes a UART emulation process which serves to use a non-UART device as a virtual UART device and to prevent the non-UART device from being put under the control of the OS.

The northbridge 203 is a bridge device which connects a local bus of the CPU 201 and the southbridge 206. The northbridge 203 is equipped with a memory controller for access-controlling the main memory 202. The northbridge 203 incorporates the graphics controller 204. Alternatively, the northbridge 203 may have a function of communicating with a graphics controller via an AGP (accelerated graphics port) bus or the like.

The graphics controller 204 is a controller for controlling the LCD 103 which is used as a display monitor of the computer 100. The graphics controller 204 outputs, to the LCD 103, a video signal corresponding to display data that has been written to the VRAM 205 by the OS or an application program.

The southbridge 206 controls individual devices on an LPC (low pin count) bus. The southbridge 206 incorporates the USB controller 207 for controlling USB devices 208 and 209 and an IDE controller (not shown) for controlling the HDD 210 and the ODD 211. In the computer 100 according to the embodiment, the USB controller 207 is an EHCI host controller which is a USB controller that complies with the USB 2.0 standard. Examples of the USB devices 208 and 209 are a USB keyboard, a USB memory, a USB optical disc drive, a USB flexible disc drive, and a USB2 debug device.

The HDD 210 is a storage device having a hard disk controller and a magnetic disk storage medium. Various kinds of software including the OS and various data are stored in the magnetic disk storage medium. The ODD 211 is a drive unit for driving a storage medium such as a DVD on which a video content (e.g., a DVD title) is stored or a CD on which musical data are stored.

The EC/KBC 213 is a one-chip microcomputer in which an embedded controller (EC) for power management and a keyboard controller (KBC) for controlling the KS 105 and the touch pad 106 are integrated together. The EC/KBC 213 is always in a power-on state being supplied with power from the power circuit 221 irrespective of whether the computer 100 is powered on. The EC/KBC 213 cooperates with the power circuit 221 to power on/off the computer 100 in response to an operation on the power button 104 by the user.

The power circuit 221 supplies power to the components under the control of the EC/KBC 213 using the power supplied from the battery 222 which is provided in the main body unit 101 or the power supplied from an external power source via the AC adaptor 223.

Next, an example UART emulation process which is executed by the BIOS 230 which is used in the computer 100 so of FIG. 1 will be described with reference to FIGS. 3-5. The following description will be directed to an example in which a USB2 debug device is used as a non-UART device. This USB2 debug device is a special USB2 device which can perform a communication using a register that is different than in the case of an ordinary USB2 device if an EHCI host controller that is compatible with the USB2 debug device is used.

Figure 3:
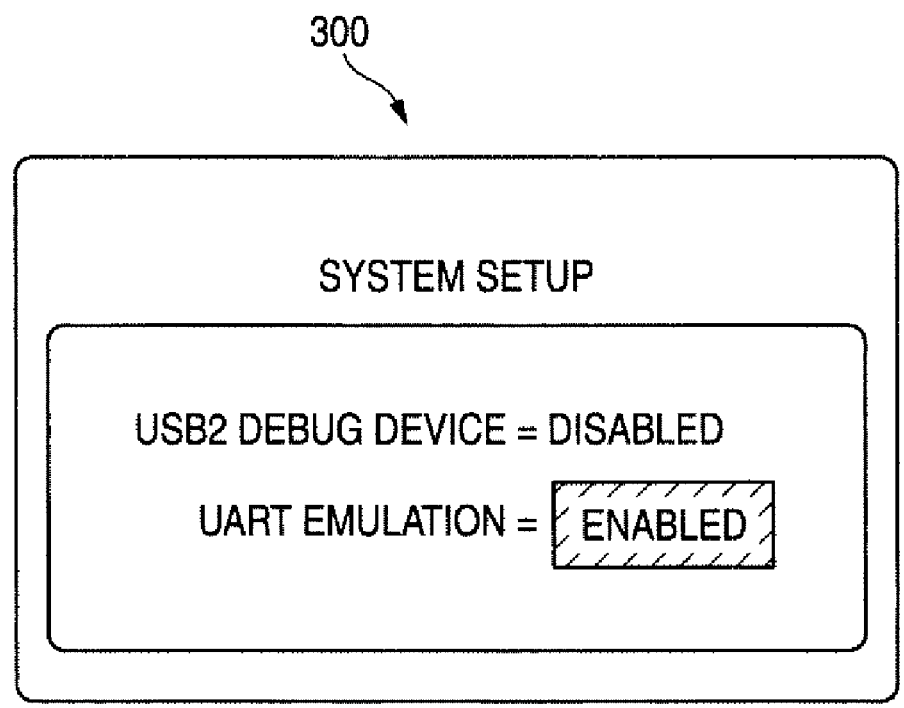
FIG. 3 shows an example BIOS setup screen used in the information processing apparatus of FIG. 1.

FIG. 3 shows an example setup screen 300 which is displayed on the LCD 103 by the BIOS 230. The setup screen 300 is a screen for prompting the user to specify whether the UART emulation process should be enabled or not. A setting item "USB2 Debug Device UART Emulation" is displayed in the setup screen 300. If the user makes a setting "USB2 Debug Device UART Emulation=Enabled," execution of the UART emulation process is enabled and the BIOS 230 starts its execution after power-on of the computer 100. That is, if the user makes a setting "USB2 Debug Device UART Emulation=Enabled," a function of allowing a non-UART device to be used stably as a virtual UART device is incorporated into the BIOS 230.

On the other hand, if the user makes a setting "USB2 Debug Device UART Emulation=Disabled," execution of the UART emulation process is disabled. In this case, the BIOS 230 does not execute the UART emulation process. Therefore, if the setting "USB2 Debug Device UART Emulation=Disabled" is made, the BIOS 230 activates the OS by performing the same processing as in the conventional case after power-on of the computer 100.

Next, an example process according to which the BIOS 230 activates the OS in response to power-on of the computer 100 will be described with reference to a flowchart of FIG. 4.

Upon power-on of the computer 100, the CPU 201 runs the BIOS 230. First, at step S401, the BIOS 230 determines whether the UART emulation is enabled on the basis of preset information. The preset information may be information that was set by the user through, for example, the setup screen 300 shown in FIG. 3. This information indicates whether the UART emulation process should be performed or not (i.e., whether the UART emulation is enabled or not) and is stored in the BIOS-ROM 212, for example.

If the UART emulation is not enabled (S401: no), at step S405 the BIOS 230 activates the OS after performing hardware initialization etc. as in the conventional case. In this case, the UART emulation process is not executed.

On the other hand, if the UART emulation is enabled (S401: yes), at step S402 the BIOS 230 disables a USB port to which a USB2 debug device is connected. This makes it possible to prevent the OS from recognize the connection of a USB device to the disabled USB terminal even if the connection is made. For example, this USB port disable function is implemented by an EHCI host controller that is incorporated in an I/O controller hub 9 (ICH9) of Intel Corporation (corresponds to the southbridge 206).

In the embodiment, the BIOS 230 serves as a disabling module configured to disable a port for connecting the non-UART device.

The ICH9 is compatible with the USB2 debug device. Although step S402 may be omitted, execution of step S402 makes it more certain that the OS does not recognize the USB2 debug device which is a non-UART device.

At step S403, if the EHCI host controller is compatible with the USB2 debug device, the BIOS 230 rewrites a capability pointer of the PCI device configuration as if the EHCI host controller were incompatible with the USB2 debug device.

In the embodiment, the BIOS 230 serves as a reconfiguration module configured to rewrite a capability pointer of a PCI device configuration to set a controller compatible of controlling a non-UART device to be incompatible.

Even if step S402 is executed, an MMIO (memory mapped IO) which is prepared for the USB2 debug device can access the USB2 debug device. Therefore, such an OS as Windows (registered trademark) Vista detects the EHCI host controller which is compatible with the USB2 debug device. Step S403 is thus necessary. The OS detects whether the EHCI host controller is compatible with the USB2 debug device by referring to the capability pointer of the PCI device configuration. Therefore, rewriting the capability pointer allows the EHCI host controller to behave as if to be incompatible with the USB2 debug device.

At step S404, the BIOS 230 executes an UART emulation process. At step S405, the BIOS 230 activates the OS after performing initialization of the other hardware and other processing.

Next, an example of the UART emulation process (step S404 shown in FIG. 4) which is executed by the BIOS 230 will be described with reference to FIG. 5.

First, at step S501, the BIOS 230 virtualizes a UART. The UART virtualization is realized by mapping part of the main memory 202 so that it provides a structure and behavior of a hardware-based UART.

In the embodiment, the BIOS 230 serves as a virtualization module configured to virtualize one or more UARTs.

At step S502, the BIOS 230 causes the OS to recognize the presence of the virtual UART by altering hardware information that is reported from a PnP (plug and play) function or an ACPI (advanced configuration and power interface).

In the embodiment, the BIOS 230 serves as a recognition module configured to cause the operating system to recognize the UARTs virtualized by the virtualization module by altering hardware information.

Figure 4:
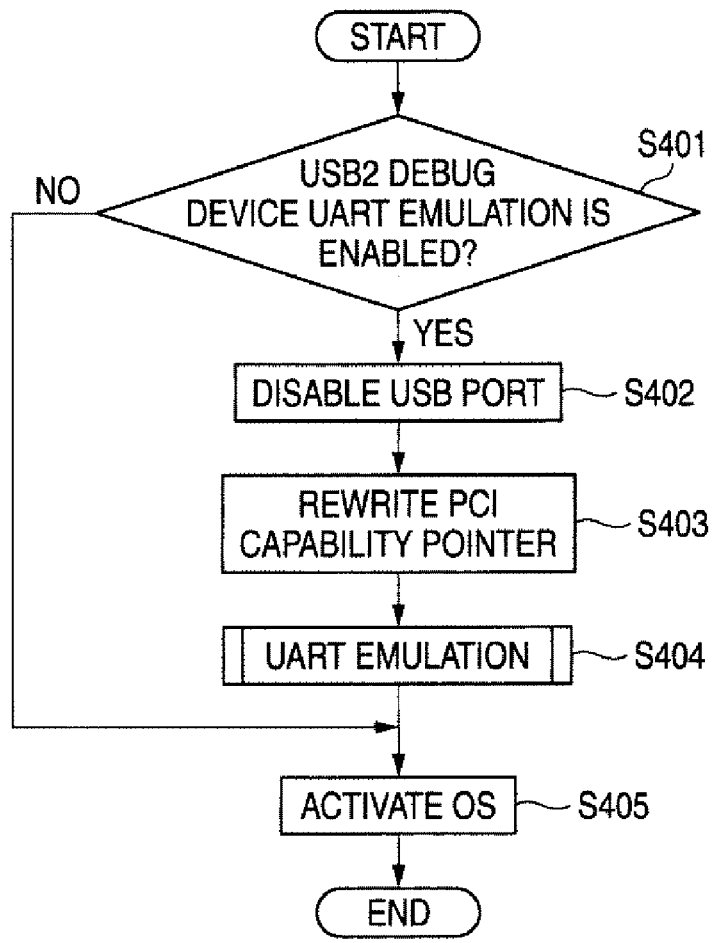
FIG. 4 is a flowchart of a process according to which a BIOS activates an OS in response to power-on of the information processing apparatus of FIG. 1.
Figure 5:
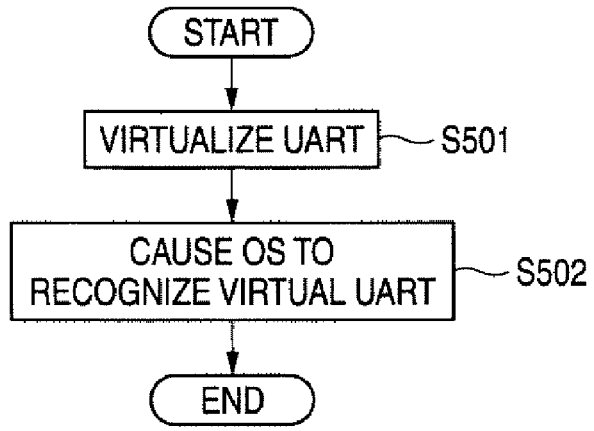
FIG. 5 is a flowchart of an example UART emulation process which is executed by the BIOS in the information processing apparatus of FIG. 1.

When the OS is activated as a result of execution of the process of FIG. 4, the emulated virtual UART comes to operate as a standard UART, whereby data can be exchanged between the computer 100 and the non-UART device connected to the computer 100 via the emulated virtual UART.

Although the embodiment is directed to the case that the USB2 debug device is used as a virtual UART device, other various kinds of hardware such as a disc drive, a solid-state drive, and a display device can be used as such a device. Where any of these devices is used as a virtual UART device, it is necessary for the computer 100 to be equipped with a controller for controlling the device.

Although the embodiment is directed to the case that one UART is emulated to use the USB2 debug device as a virtual UART device, plural UARTs may be emulated to use plural virtual UART devices. In this case, the OS can simultaneously access, via the plural emulated virtual UARTs, the virtual UART devices connected to the UARTs, respectively.

The USB2 debug device can use, as either an OS debug port or a BIOS debug port, a virtual UART that is realized according to the invention.

The preferred embodiment of the invention has been described above. However, the invention is not limited to the above embodiment itself and may be embodied in such a manner that constituent elements are modified without departing from the spirit and scope of the invention. And various inventions can be conceived by properly combining plural constituent elements disclosed in the embodiment. For example, several ones of the constituent elements of the embodiment may be omitted.

Although the embodiments according to the present invention have been described above, the present invention is not limited to the above-mentioned embodiments but can be variously modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus for using a non-UART (Universal Asynchronous Receiver Transmitter) device connected thereto as a virtual UART device, the apparatus comprising:
    a rewriting module configured to rewrite a capability pointer of a PCI (Peripheral Component Interconnect) device configuration set a controller to be incompatible with the non-UART device when the controller for controlling the non-UART device is compatible with the non-UART device, the non-UART device being a USB2 (Universal Serial Bus 2.0) debug device and the controller being an EHCI (Enhanced Host Controller Interface) host controller;
    a virtualization module configured to virtualize one or more UARTs; and
    a recognition module configured to cause an OS (operating system) used in the information processing apparatus to recognize presence of the virtual UARTs by altering hardware information.

2. The apparatus of claim 1 further comprising:
    a disabling module configured to disable a port to which the non-UART device is to be connected.

3. An emulation method of a UART (Universal Asynchronous Receiver Transmitter) for using a non-UART device connected to an information processing device as a virtual UART device, the method comprising:
    rewriting a capability pointer of a PCI (Peripheral Component Interconnect) device configuration to set a controller to be incompatible with the non-UART device when the controller for controlling the non-UART device is compatible with the non-UART device, the non-UART device being a USB2 (Universal Serial Bus 2.0) debug device and the controller being an EHCI (Enhanced Host Controller Interface) host controller;
    virtualizing one or more UARTs; and
    causing an OS (Operating System) used in the information processing apparatus to recognize presence of the virtual UARTs by altering hardware information.

4. The method of claim 3 further comprising:
    disabling a port to which the non-UART device is to be connected.

* * * * *